United States Patent [19]

Duchateau et al.

[11] 4,311,673

[45] Jan. 19, 1982

[54] APPARATUS FOR EXTRACTING WITH A LIQUID, PRODUCTS WHICH ARE PART OF SOLIDS

[75] Inventors: Georges F. M. Duchateau, Brussels; Charles H. J. Pinet, Hoegaarden; Pierre X. Hanot, Jodoigne, all of Belgium

[73] Assignee: Raffinerie Tirlemontoise, Brussels, Belgium

[21] Appl. No.: 187,893

[22] Filed: Sep. 17, 1980

[30] Foreign Application Priority Data

Oct. 4, 1979 [BE] Belgium .................................. 19747

[51] Int. Cl.³ ............................................ B01D 11/02
[52] U.S. Cl. ...................................... 422/272; 127/6; 127/45
[58] Field of Search ............... 209/452, 268, 270, 274, 209/279; 134/60, 65, 122, 104; 210/267; 422/261, 270, 272, 273, 268, 274; 127/5–7, 45

[56] References Cited

U.S. PATENT DOCUMENTS 3,660,042  5/1972  Duchateau et al. ................. 422/272
3,809,538  5/1974  Duchateau ............................ 422/272
3,853,615  12/1974 Backofen et al. ................. 422/272 X

FOREIGN PATENT DOCUMENTS 7859  2/1980  European Pat. Off. ............... 127/45

Primary Examiner—Ralph J. Hill
Attorney, Agent, or Firm—Sughrue, Mion, Zinn, Macpeak and Seas

[57] ABSTRACT

The apparatus comprises inside a rotating drum, two conveying screws nested inside one another and a partition passing through the drum axis to form two series of succeeding cells inside which the solids and the liquid move in counter-current, two liquid channels being so arranged as to start from each cell to end in another cell, the one channel extending along the drum axis while the other channel lies cross-wise thereto. The cross-wise channel increases the liquid portion separated from the solids by recovering liquid which would otherwise flow back into the solids as portions of the partition pass the horizontal. The channel is obtained by extending one wall of a basket provided in each cell beyond the axis of the drum.

7 Claims, 7 Drawing Figures

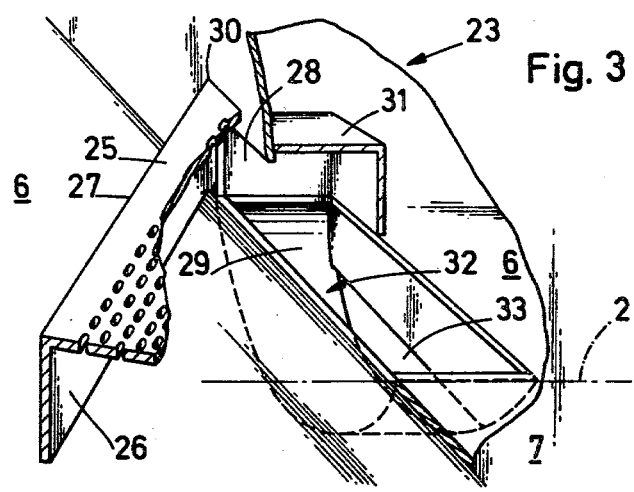
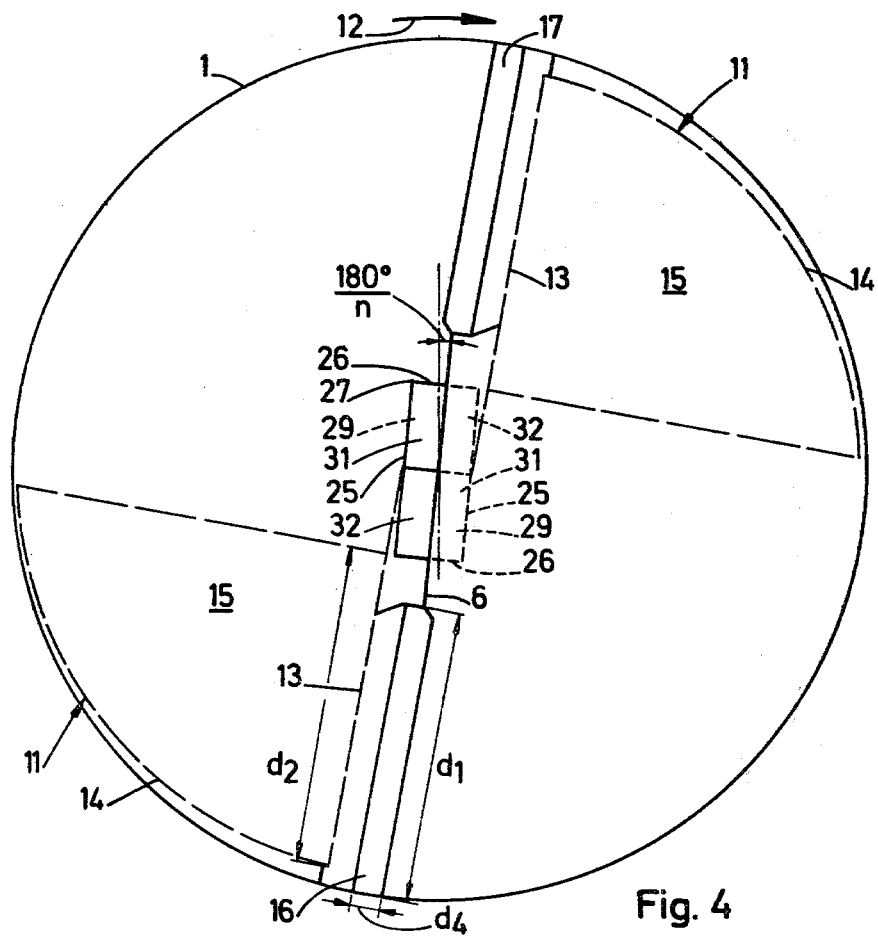

APPARATUS FOR EXTRACTING WITH A LIQUID, PRODUCTS WHICH ARE PART OF SOLIDS

This invention relates to a liquid/solid extracting apparatus, of the rotating-drum type, inside which two solids fractions and two liquid flows are fed in counter-current and separately, by means of components from two conveying spiral screws and liquid channels, in such a way that:

each solid fraction undergoes during a drum revolution over 360°, an axial displacement equal to one-half of the conveying screw pitch, partly in admixture with the liquid and partly out of the liquid, while sliding on a diametrical partition after separating the liquid from the solid, each solid fraction passing at each drum revolution, through a mixing step with the one liquid flow and through a separating step from said flow, both liquid flows alternating at each revolution;

each liquid flow undergoes during a drum revolution over 360°, an axial displacement by one screw pitch, in a direction opposite to the feeding direction of the solids, resulting from a double progression-regression movement, partly jointly with a solid fraction (regression), and partly after being separated from said solids fraction (progression), inside liquid channels having suitable length and path to retain the separation of both liquid flows, by passing sealingly through components from the one conveying screw. For every drum revolution, the total axial displacement of both liquid flows is thus one conveying screw pitch in the direction opposite to the axial displacement of both solids fractions, which does only correspond to one-half pitch from those same conveying screws.

A known apparatus from this type comprises a horizontal-axis rotating drum, two conveying spiral screws, nested inside one another and arranged co-axially within said drum, and a solid diametrical partition forming together with solid radial walls of the conveying screws, two series of succeeding cells.

During one drum revolution, the solids never pass through the diametrical partition. Both conveying screws continuously feed that solids fraction which is contained inside the cell series lying on the one side of said diametrical wall, while the other solids fraction advances inside the cell series lying on the other side of said diametrical partition.

A perforated basket is arranged inside each cell to separate the solids from the liquid, in front of the diametrical partition, as considered relative to the drum revolution direction.

Said basket is comprised of an array of perforated metal sheets substantially in parallel relationship with the various walls comprising said cells, said sheets having a total surface area in proportional relation with the liquid volume which will pass through said basket.

Radial-section channels insure the movement of the liquid collected between said perforated baskets and the diametrical partition and cause said liquid to flow along a direction in parallel relationship with the drum axis.

Said channels extend from the drum circumference and have a radial height equal to the perforated basket height to let said baskets further collect that liquid separated during raising of the solids in the perforated baskets, when said diametrical partition reaches and goes somewhat past the horizontal position.

Said channels cause the liquid to move in a direction opposite the movement direction of said solids, each channel connecting through openings provided in the radial walls of the conveying screws and the diametrical partition of the drum, a cell from one screw conveying part of the one solids fractions to the suitable cell of the screw conveying part of the other solids fractions, on the other side of said diametrical partition.

The passage through the diametrical wall of said channels which are substantially in parallel relationship therewith, occurs due to the staggering of said wall from the one cell relative to the wall from the following cell, which staggering is provided when designing the drums to balance during the revolution thereof, the raising torque of the solids.

Considered as a whole, the liquid moves through the drum in two discrete parallel flows, which meet alternately and in sequence, the solids lying inside each apparatus cell.

Means are further provided to feed solids to each conveying screw at that apparatus end where both liquid flows are extracted and to feed liquid to each of said screws at that apparatus end where both solid fractions are discharged at the end of the extracting.

This invention has the object of, by changing the inner structure of the drum in an apparatus of the above defined type, improving the conditions of the liquid-solids separation step during the drum revolution and substantially lengthening the time duration of said step, to avoid part of the separated liquid at the end of the solids raising step from moving together with said solids during the sliding thereof on said diametrical partition.

For this purpose, according to the invention, the apparatus comprises in association with each said liquid channel extending along the drum axis, a liquid channel arranged inside each cell and extending cross-wise to said axis, adjacent thereto, to collect the liquid which has been separated from the solids and flowing over said wall when same lies in a position near the horizontal and has moved past said position, said channel extending along the drum axis and the cross-wise channel associated therewith starting from one and the same cell and ending in one and the same cell.

Said channels cross-wise to the drum axis thus insure the flow of that liquid fraction separated by the perforated baskets when the diametrical partition lies in a quasi-horizontal position and goes past same, and feed said fraction to the same cell as the main liquid fraction which has been separated before said diametrical partition has reached the horizontal position thereof and which is collected by the channels which extend along the drum axis. That liquid fraction collected by the cross-wise channels passes through the same partitions and walls than the liquid fraction collected by the axial channels, but in different locations, in such a way that the liquid fraction flowing in the cross-wise channels follows a much shorter path than the path followed by the liquid flowing through the axial channels. There results that the liquid fraction flowing through the cross-wise channels rains on the liquid-solid mixture and thus enhances the mixture quality.

Said cross-wise channels have the same function as the axial channels but act in a later stage of the drum-revolution, in which stage where inside the drums of known apparatus, the liquid separated from the solids is carried along with said solids when they loosen and start sliding on the diametrical wall, and does not follow any more the suitable path for a suitable obtaining of the liquid-solid counter-current.

The suitable liquid flow may be retained inside the cross-wise channels according to the invention and this up to the end of the sliding of those solids contained inside the baskets, instead of stopping as this is the case in the known apparatus adjacent that location where the diametrical partition reaches the horizontal position.

From tests made on an industrial-scale pilot apparatus, the arrangement of said cross-wise channels has allowed an increase by about 5%, relative to the known apparatus, in that liquid portion which is suitably separated from the solids. Such increase, which substantially changes the mathematical conditions of liquid-solid extracting, may be obtained without requiring very large passage cross-sections in the channels cross-wise to the drum axis, which consequently will not hamper the sliding of the solid materials during the raising thereof.

Moreover by providing said cross-wise channels, there is obtained the advantage of allowing, according to the invention, a substantial simplification of the drum inner structure at the level of the axial liquid channels, said channels having in the known apparatus, an extended rectangular cross-section and a rather intricate axial profile. Such simplification, besides the ease of manufacturing and the lowering of the drum costs, brings various important advantages, such as easier maintenance of said liquid channels, the inside of which becomes accessible, smaller dead volumes formed by said channels during a substantial portion of the liquid-solid mixing step and when the solids slide on the diametrical partition.

Indeed according to the invention, associating cross-wise channels to the axial channels allows reducing the radial size of the liquid channels relative to the channel size in the known apparatus and arranging same adjacent the drum circumference while designing said channels with a cross-section which is smaller than for the channels in said known apparatus, but balanced in the radial and width proportions, and with a more direct axial path which causes less pressure loss during the liquid flow, while comprising during the liquid-solid mixing step a smaller dead volume. Associating axial and cross-wise channels does away with the requirement as in the known apparatus, for baskets and liquid channels with substantially equal sizes, in such a way that the radial size of the baskets may be increased, which allows distributing very differently and much more efficiently the basket areas. Moreover according to the invention, it is possible in an advantageous embodiment, to provide part of a diametrical partition separating two corresponding cells in both solids circuits, being staggered angularly in the opposite direction to the drum revolution direction relative to that adjacent diametrical partition portion which lies upstream when considering the solids movement direction, while inside the drum from the above-described known apparatus, such staggering had necessarily to be in the opposite direction to allow the separated liquid flowing axially when the diametrical partition lies about the horizontal position.

Such staggering inversion besides allowing a better path design for the axial channels, increases that part of the drum revolution which is imparted to the liquid-solid mixing step, thus improving the extracting. With a staggering of the partition portions in the direction opposite to the drum revolution direction, the angular staggering between two succeeding partition portions separating solids from the liquid is 185° while it is but 175° with a staggering in the drum revolution direction.

It is also to be noted that the new distribution of the basket perforated surface area which is made possible by the axial size of the basket wall being no more a function of the axial dimension of said axial channels, further allows to substantially lengthen the liquid-solid mixing step. Extending of the perforated basket sheet in parallel relationship with said partition allows as that total surface of the perforated basket is constant for a given volume of that liquid which will pass through the basket, to make smaller that basket perforated sheet which is co-axial with the drum wall, which further contributes to the substantial increasing of the liquid-solid mixing step. The size increase for said perforated basket sheet further enlarges the separating area contacting the solids at the end of the raising of said solids when the flowing of the last liquid fraction is most difficult.

Other details and features of the invention will stand out from the following description given by way of non limitative example and with reference to the accompanying drawings, in which:

FIG. 3 is a perspective view showing on a larger scale than in FIGS. 1 and 2, a detail of the liquid channels arranged cross-wise to the drum axis.

FIG. 4 is a diagrammatic cross-section along line IV—IV in FIG. 1, the drum being shown in a slightly different position relative to FIG. 1.

In the various figures, the same reference numerals pertain to similar elements.

Figure 1:
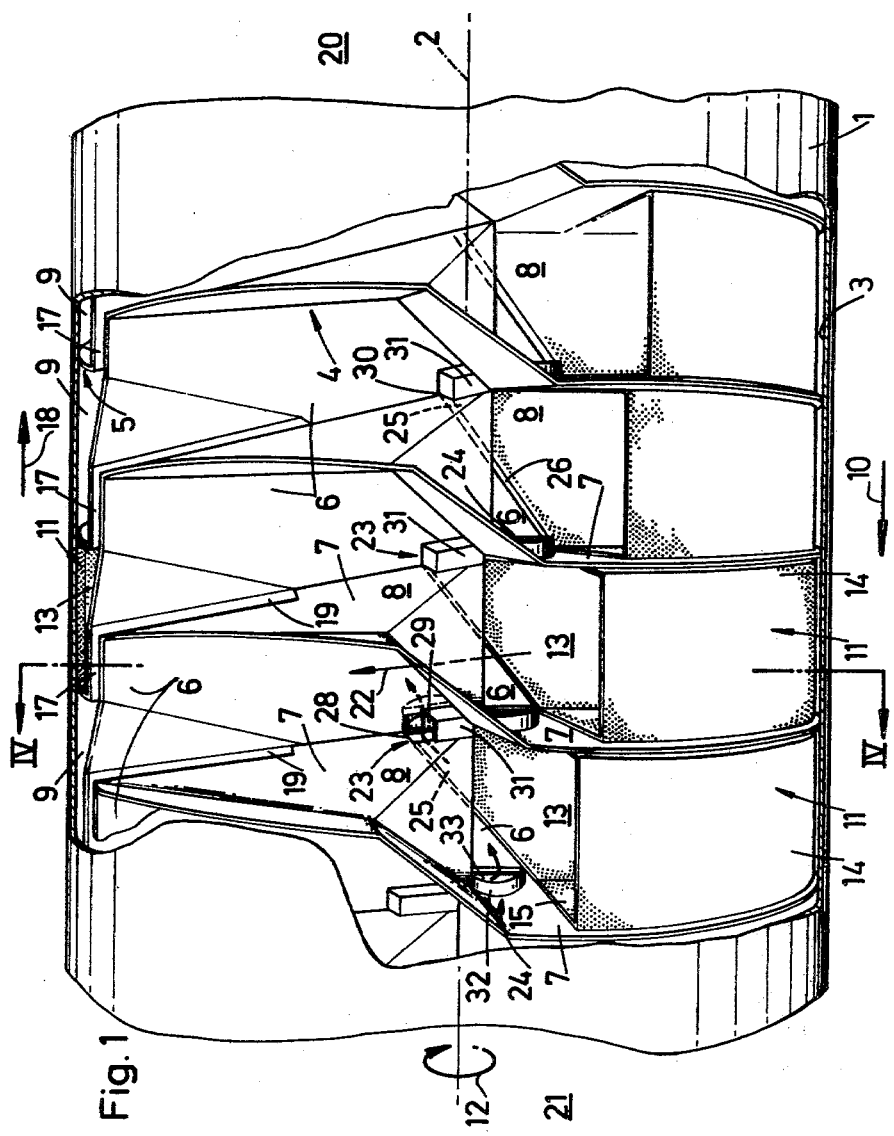
FIG. 1 is a perspective view with parts broken away, of an apparatus according to the invention.
Figure 2:
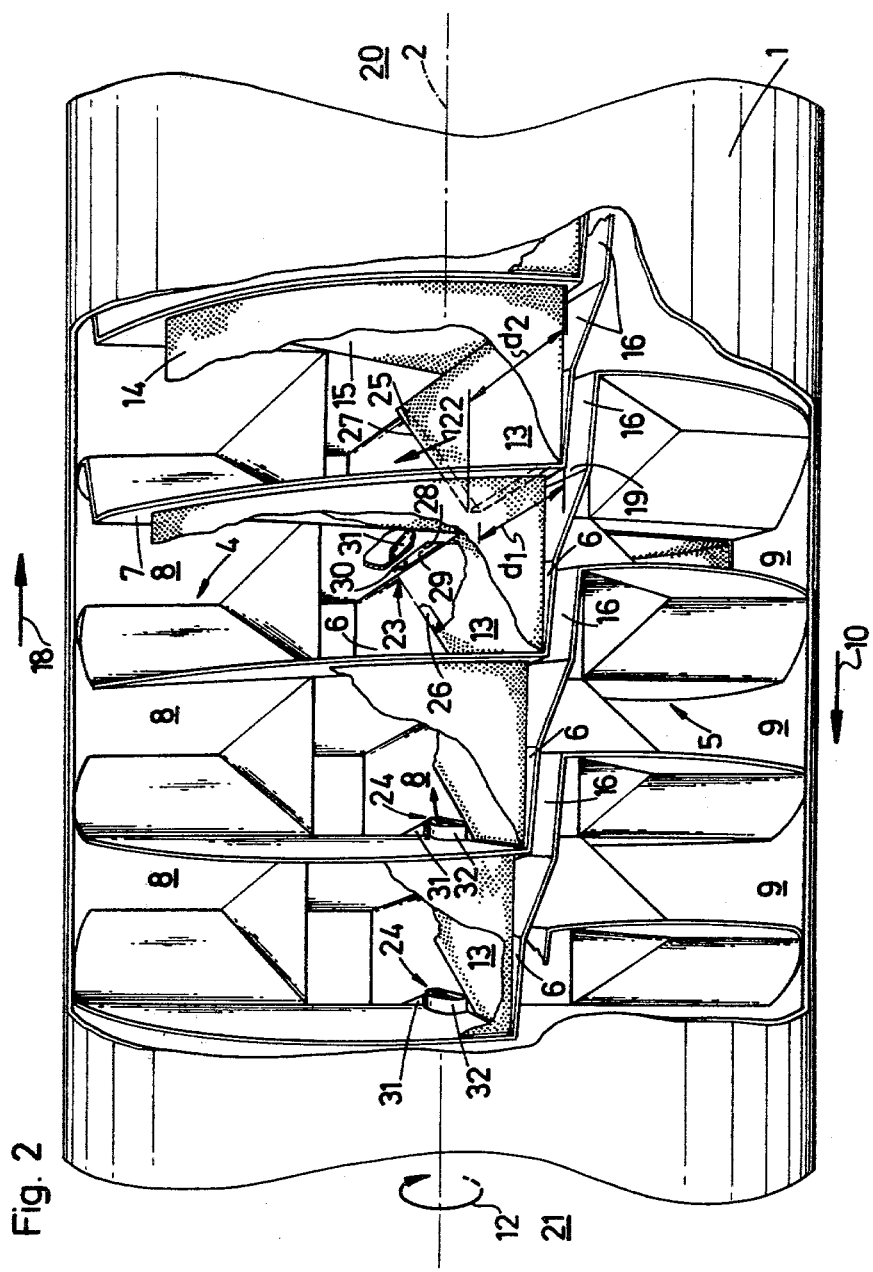
FIG. 2 is a view similar to FIG. 1 showing the apparatus from another angle.

The apparatus as shown in the drawings comprises a cylindrical drum 1 which is rotatable about a lengthwise axis 2. Two conveying spiral screws 4 and 5 with a structure as described in Belgian Pat. Nos. 711,219 and 728,417, are arranged inside said drum to contact the inner surface 3 thereof. Said conveying spiral screws are nested within one another and are co-axial relative to drum 1. A partition 6 passing through axis 2 of said drum bounds, together with those radial walls 7 of the conveying screws which extend cross-wise to said axis 2, two series of succeeding cells 8 and 9. In one series, one solid fraction advances continuously along a direction in parallel relationship with axis 2 as shown by arrow 10, while the other solid fraction moves in the same direction and without being mixed with the first fraction, inside the other cell series. Each cell from each series comprises a basket 11 pervious to the liquid for separating the solids therefrom during drum revolution in the direction shown by arrow 12. Each such basket 11 is comprised of a perforated wall 13 which extends substantially in parallel relationship with the diametrical partition 6, a perforated wall 14 co-axial with drum 1, and perforated walls 15 in parallel relationship with said radial walls 7 and joining said walls 13 and 14, lie within the cell thereof, on one side of a plane passing through drum axis 2 at a right angle to partition 6. Axial channels 16 and 17 are provided for the liquid, and are arranged, as considered relative to the drum rotation direction, at the back of basket wall 13. Said channels 16 and 17 extend from the drum circumference, along axis 2 and slant relative thereto to cause the liquid to flow along arrow 18 in the direction opposite to both said solid fractions, each channel 16 connecting, through partition wall 6 and openings 19 provided in walls 7, a cell 8 to a following cell 9 while each one of said channels 17 connects, through partition 6 and said openings 19, a cell 9 to a following cell 8 to cause the liquid to flow in two discrete parallel flows which meet alternately and succeedingly those two solids fractions which lie the one in cells 8 and the other one in cells 9 from the apparatus and to obtain both flows advancing during one drum revolution over 360°, through two cells in the direction opposite to the solids movement direction, said solids moving during said 360°-revolution but through one cell. Said apparatus further comprises means for feeding each conveying screw with solids at the apparatus end where both liquid flows are extracted, and for feeding each said screw with liquid at the apparatus end 21 where both solid portions are extracted, said means being shown and described, together with the means for extracting solids and liquid, in Belgian Pat. Nos. 711,219 and 728,417.

In the embodiment of the apparatus as shown in FIGS. 1 to 4, each part of the diametrical partition 6 separating two corresponding cells 8 and 9 in both cell series, as well as each basket lying next to the considered wall portion, are staggered, to balance the apparatus drum, angularly in the drum revolution direction relative to the partition portion and adjacent baskets lying upstream, when considering the solids conveying direction. Said staggering is substantially equal to (180°/n), with n being the number of cells in a cell series.

According to the invention and notably for increasing the liquid portion which is suitably separated from the solids by recovering at each drum revolution and inside each cell, that liquid which would flow back together with the solids, during the separating of the solids from the liquid as said solids slide along the direction of arrow 22, on the basket walls 13 and the portions from partition 6 as they reach the horizontal position thereof and beyond same, with each axial liquid channel 16, 17 is associated a liquid channel 23 or 24 which is arranged inside each cell 8 or 9 and which extends cross-wise to the drum axis adjacent said axis, to collect liquid separated from the solids and flowing over partition 6 when same lies in a position adjacent to the horizontal and has passed said position, the axial channel 16 or 17 and that channel 23 or 24 associated therewith starting from one and the same cell 8 or 9 and opening in one and the same cell.

The channels 23 and 24 are obtained by extending the wall 13 of each basket 11 provided in each cell 8 and 9 of the apparatus beyond the drum axis. Said extension 25 is perforated partly at least to be pervious to the liquid and it is connected on the one hand to both radial screw walls 7 bounding said cell and on the other hand, to said part of partition 6 through a solid wall 26 which extends along the free edge 27 of extension 25 lying between both said walls 7, between said free edge 27 and said part of partition 6. That volume which is bounded by extension 25 of basket wall 13—walls 7-solid wall 26—said part of partition 6 and the plane at right angle thereto which passes through axis 2, of a cell in a cell series wherein the liquid is collected when said portion of partition 6 reaches and goes past the horizontal, communicates when considering the solids conveying direction, with the preceding cell in the other cell series. The free edge 27 of extension 25 and the wall 26 connecting said edge to said portion of partition 6 lie at an angle relative to axis 2, said wall 26 intersecting said axis 2 substantially half-way from the screw walls 7 bounding said cell under consideration, that angle formed by wall 26 and axis 2 being about 30°. The volume defined between extension 25, wall 26, radial walls 7, partition 6 and a plane at right angle thereto passing through the axis 2, of a cell from a cell series communicates through an opening 28 provided in that radial wall 7 separating said cell from the preceding one in the same cell series when considering the solids movement direction (arrow 10), and through an opening 29 provided in the portion of diametrical partition 6 from said preceding cell, with the following cell when considering the liquid movement direction (arrow 18), from the other cell series. Both openings 28 and 29 lie between axis 2 and end 30 of extension 25 of perforated wall 13 and they are joined by a duct 31.

To prevent the liquid flowing through channels 23 and 24 impacting during the drum revolution, walls 26, said channels have been designed to open into an overfall 32 provided in that cell the liquid reaches and the opening 33 of which lies some distance away from diametrical partition 6; the spacing between said partition and opening 33 being at least equal to the spacing between said edge 27 and partition 6. Said overfall 32 prevents the clogging of channels 23 and 24 during the sliding of solids along the direction of arrow 22.

In the embodiment of the apparatus as shown in FIGS. 1 to 4, the dimension d1 of channels 16 and 17 as considered radially, is substantially equal to the corresponding dimension d2 of wall 13 from a basket 11 as considered adjacent that radial wall 7 which lies opposite extension 25 of said wall 13.

Figure 5:
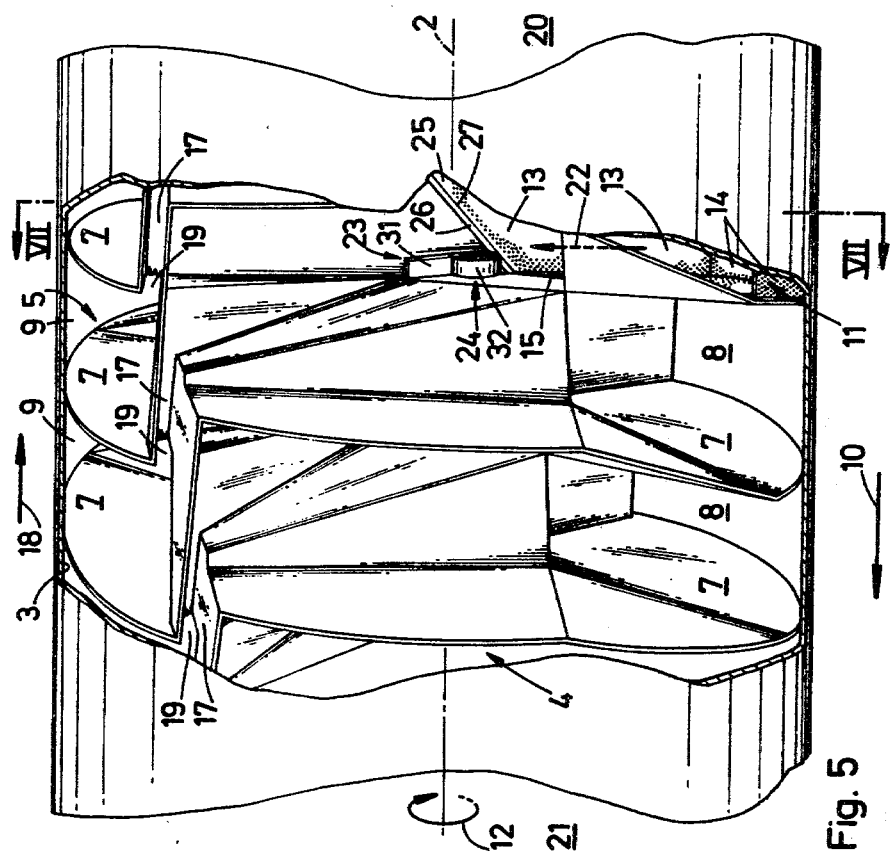
FIGS. 5 and 6 are views similar to FIGS. 1 and 2 showing a variation of the apparatus as shown in FIGS. 1 to 4.
Figure 6:
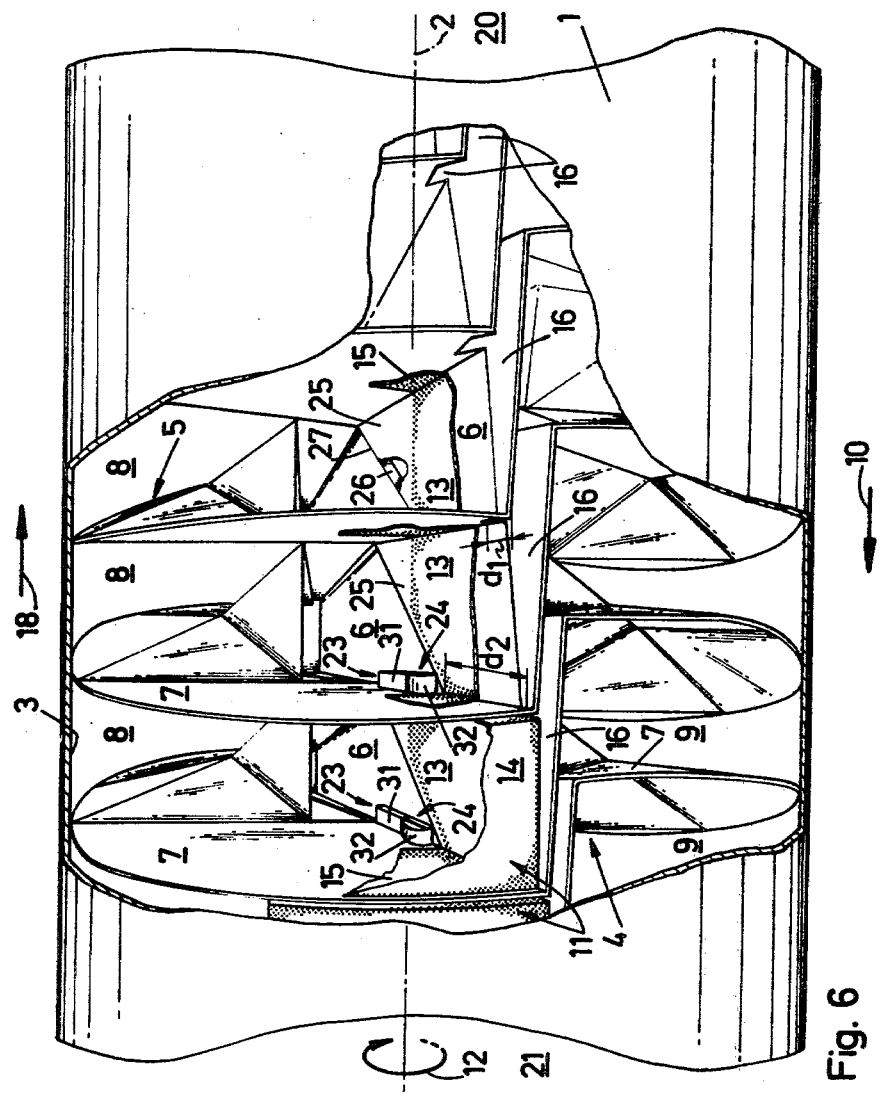
Figure 7:
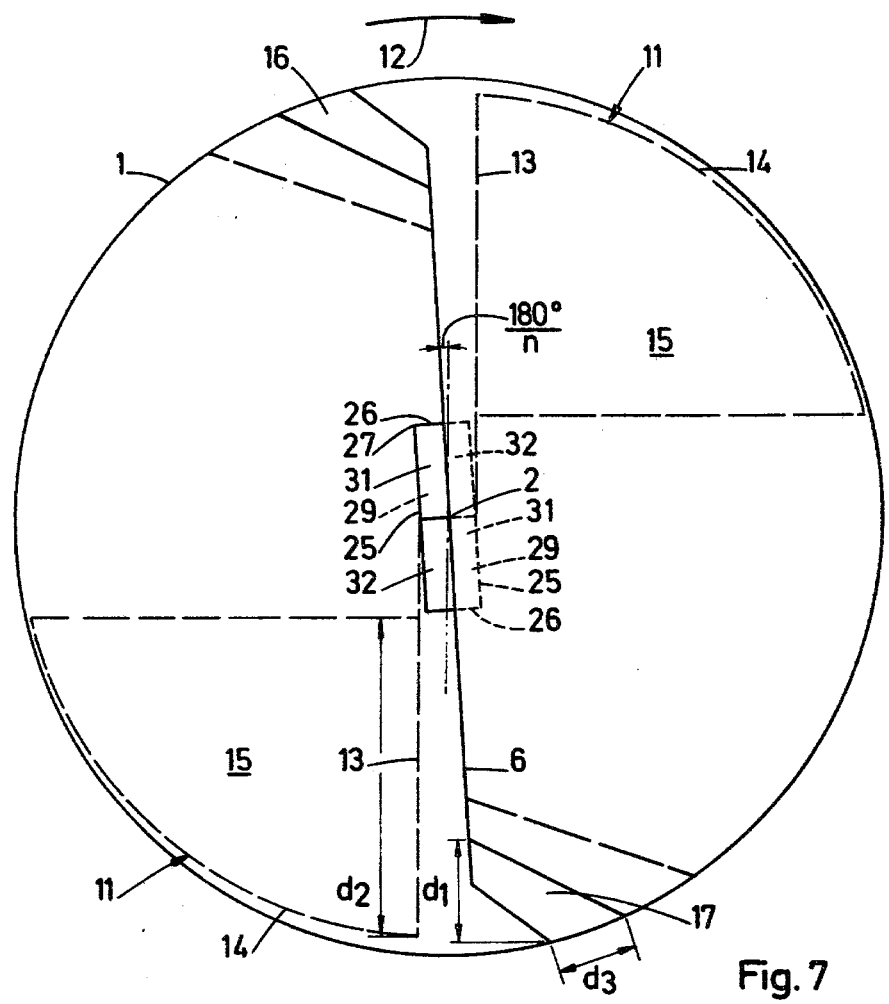
FIG. 7 is a diagrammatic cross-section along line VII—VII in FIG. 5.

By providing according to the invention, liquid channels 23 and 24 cross-wise to drum axis 2, it is possible as shown in the apparatus from FIGS. 5 to 7, on the one hand to stagger the portions of partition 6 and baskets 11 by an angle equal to the above-defined angle but in the direction opposite to the drum revolution direction, and on the other hand to obtain liquid channels 16 and 17 the dimension d1 of which as considered radially, is much smaller than the dimension of the liquid channels in the apparatus as shown in FIGS. 1 to 4, and the dimension d3 of which is much greater than the coresponding dimension d4 of the channels in said apparatus as shown in FIGS. 1 to 4. It is clear that the structure of the rectilinear channels 16 and 17 as shown in FIGS. 5 to 7 is much simpler than the structure of the ducts provided in the above-described apparatus and that the access thereto is made much easier. Moreover, said channels 16 and 17 as shown in FIGS. 5 to 7, may be sized only according to the flow speed of the liquid and no longer according to structural requirements and clogging dangers, which results in smaller dead volumes. In other words, channels 16 and 17 in the apparatus as shown in FIGS. 1 to 4 are oversized due to the large dimension thereof in the radial direction to avoid clogging same.

To let a maximized volume flow through channels 23 and 24 while retaining for said channels such a cross-section that they do not hamper the passage of the solids, it is possible according to the invention and as shown in the embodiment of the apparatus in FIGS. 5 to 7, to provide an extension 25 of wall 13 which is not perforated in that area thereof lying beyond axis 2 in such a way as to comprise, beyond said axis, a funnel, the whole contents of which flows into said channels 23 and 24 after partition 6 has moved beyond the horizontal position thereof.

The staggering of said portions of partition 6 and baskets 11, the collecting of the liquid by means of large section channels 16 and 17 arranged on the drum circumference and cross-wise channels 23 and 24 allows in the apparatus as shown in FIGS. 5 to 7, not only as defined above, to make the apparatus structure simpler while lowering the cost thereof in a marked way and while making the access to channels 16 and 17 easier, but also to extend that portion of the drum revolution intended for the liquid-solid mixing step and thus to improve the extraction. Such extension is due to the angular staggering between two succeeding portions from partitions 6 being equal in the apparatus as shown in FIGS. 5 to 7, to 185° while it is but 175° in the apparatus as shown in FIGS. 1 to 4.

It must be understood that the invention is in no way limited to the above embodiments and that many changes can be brought therein without departing from the scope of the invention as defined by the appended claims.

For instance it would be possible to provide both said embodiments with flow-control and liquid-distribution sheets inside the cells, as described in Belgian Pat. No. 768,553.

We claim:

1. Apparatus for extracting by means of a liquid, products which are part of solids, comprising; a rotating drum having a substantially horizontal axis, two conveying spiral screws nested within one another and arranged co-axially with said axis, a partition passing through said drum axis and forming, together with the radial walls from the conveying screws, two series of succeeding cells inside which move continuously without mixing along a direction in parallel with said axis, two fractions of solids, one said fraction being contained inside that cell series lying on one side of said partition, the other fraction being contained inside those cells lying on the other partition side, a basket pervious to said liquid and arranged inside each one of said cells for separating the solids from the liquid during rotation of said drum, said basket comprising at least one perforated wall extending substantially parallel with said partition in front thereof when considering the drum rotating direction, said wall being so arranged that said basket lies on one side of a plane perpendicular to said partition which passes through the drum axis, liquid channels arranged at the back of that basket substantially in parallel relationship with said partition and extending from the drum circumference, along the drum axis for feeding said liquid in a direction opposite a conveyance direction of said solids, each said channel connecting, through said partition and openings provided in the conveying screw walls, one cell from a screw conveying part of said one solid fraction to the following cell from the screw conveying the other solids fraction in such a way that the liquid flows in two discrete parallel flows which meet alternately succeedingly those solids lying inside each apparatus cell, and such that the liquid flows advance during one drum revolution over 360°, over two cells in the direction opposite to the conveying direction of said solids, while the solids advance but over but over one cell, with the improvement that said apparatus comprises in association with each of said liquid channels extending along the drum axis, a liquid channel arranged inside each cell and extending cross-wise to said axis, adjacent thereto, for collecting the liquid which has been separated from the solids and flowing over said wall, when same lies in a position near the horizontal and has moved past said position, said channel extending along the drum axis and the cross-wise channel associated therewith starting from one and the same cell and ending in one and the same cell.

2. Apparatus as defined in claim 1, in which each channel extending cross-wise to the drum axis is bounded, in the cell from which the liquid flows, by an extension beyond the drum axis of that basket wall substantially in parallel relationship with said partition which extends between the radial screw walls, said partition, the screw walls and a solid wall joining over the whole length thereof, the free edge of the perforated wall extension to said partition, the volume lying between said components of a cell from a cell series communicating through an opening provided in the radial wall separating same from the preceding cell in the same series when considering the movement direction of the solids, and through an opening provided in the wall of said preceding cell, with the following cell when considering the liquid movement direction, in the other cell series, both said openings lying on the same axis side as said extension, and being joined by a duct.

3. Apparatus as defined in claim 2, in which said extension of the perforated basket wall is perforated at least partly, in the area thereof lying beyond the drum axis.

4. Apparatus as defined in claim 2, in which said extension of the perforated basket wall is not perforated in the area thereof lying beyond the drum-axis.

5. Apparatus as defined in claim 2, in which the opening provided in said partition opens inside an overfall provided inside that cell into which the liquid flows, and the opening of which lies some distance away from said partition, the spacing between said partition and said opening being at least equal to the spacing between said partition and said perforated basket wall which is substantially in parallel relationship with said partition, arranged inside said cell into which the liquid flows.

6. Apparatus as defined in claim 1, in which each portion of said partition separating two corresponding cells from both cell series, is angularly staggered in the drum rotation direction, relative to that adjacent partition portion lying upstream, when considering the solids movement direction, said staggering being substantially equal to (180°/n) or a multiple thereof, n being the number of cells in a cell series, the dimension of the liquid channels extending along the drum axis, as considered radially, being at the most equal to the smallest corresponding dimension of the basket wall in parallel relationship with said partition.

7. Apparatus as defined in claim 1, in which each portion of said partition separating two corresponding cells from both cell series, is staggered angularly in the direction opposite to the drum rotation direction, relative to that adjacent partition portion lying upstream when considering the conveying direction of the solids, said staggering being substantially equal to (180°/n) or a multiple thereof, n being the number of cells in a cell series, the dimension of the liquid channels extending along the drum axis, as considered radially, being at the most equal to the smallest corresponding dimension of the basket wall in parallel relationship with said partition.

* * * * *

UNITED STATES PATENT AND TRADEMARK OFFICE
CERTIFICATE OF CORRECTION

PATENT NO. : 4,311,673
DATED : January 19, 1982
INVENTOR(S) : George F.M. Duchateau et al.

It is certified that error appears in the above—identified patent and that said Letters Patent is hereby corrected as shown below:

Column 1, change the number of the Belgian priority document from "19747" to -- 197471 --.

Signed and Sealed this

Fourth Day of May 1982

[SEAL]

Attest:

Attesting Officer

GERALD J. MOSSINGHOFF

Commissioner of Patents and Trademarks